United States Patent
Berkbuegler (10) Patent No.: US 6,722,472 B2
(45) Date of Patent: Apr. 20, 2004

(54) ADJUSTABLE TREE STAND

(76) Inventor: Ronald L. Berkbuegler, 8767 Old Lebanon/Troy Rd., Troy, IL (US) 62294

( * ) Notice: Subject to any disclaimer, the term of this patent is extended or adjusted under 35 U.S.C. 154(b) by 0 days.

(21) Appl. No.: 10/121,907

(22) Filed: Apr. 12, 2002

(65) Prior Publication Data

US 2003/0192741 A1 Oct. 16, 2003

(51) Int. Cl.⁷ .......................... E04G 3/00; A63B 27/00
(52) U.S. Cl. .................. 182/187; 182/135; 108/152
(58) Field of Search ................... 182/135, 136, 182/188, 187, 20, 116; 108/152; 297/217.7

(56) References Cited

U.S. PATENT DOCUMENTS

| | | |
|---|---|---|
| 2,060,953 A | 11/1936 | Strom |
| 2,168,111 A | 8/1939 | Barnes |
| 3,743,050 A | 7/1973 | Danz |
| 4,549,635 A | 10/1985 | Early |
| 4,782,918 A | 11/1988 | Brunner et al. |
| 4,995,475 A | 2/1991 | Berkbuegler |
| 5,379,861 A | 1/1995 | Amacker |
| 5,409,083 A * | 4/1995 | Thompson et al. ......... 182/187 |
| 5,462,135 A | 10/1995 | Ambler et al. |
| 5,469,934 A * | 11/1995 | Pherigo ..................... 182/187 |
| 5,588,499 A | 12/1996 | Carriere |
| 5,628,383 A | 5/1997 | McIntyre |
| 5,791,436 A | 8/1998 | Talley |
| 5,848,666 A * | 12/1998 | Woodall et al. ............. 182/187 |
| 5,862,883 A | 1/1999 | Carriere |
| 6,085,868 A | 7/2000 | Anthony et al. |
| 6,102,158 A * | 8/2000 | Winschel ..................... 182/187 |

* cited by examiner

Primary Examiner—Hugh B. Thompson, II
(74) Attorney, Agent, or Firm—Senniger, Powers, Leavitt & Roedel (57) ABSTRACT

A tree stand adapted for mounting in a tree to support a person. The stand includes a back frame and a platform attached to the back frame. A length of chain passes generally horizontally around the trunk to secure the back frame to the tree. The chain is generally rigid and self-supporting in the vertical direction but freely movable in the horizontal direction to wrap around the trunk of the tree. A hook is configured to secure the length in a loop, and a ratchet mechanism controllably decreases a circumference of the loop to secure the back frame to the tree. A pivotally mounted rest is configured for engaging the tree trunk so that the stand may be mounted on a non-vertical tree trunk with the platform in a level orientation. A seat and a post, together with the back frame and platform, are hinged together in a structure capable of folding between deployed and collapsed positions.

13 Claims, 6 Drawing Sheets

ADJUSTABLE TREE STAND

BACKGROUND OF THE INVENTION

This invention relates generally to platform assemblies, and in particular to a portable tree stand for supporting a person in a tree which is readily attachable to a tree.

Tree stands are used for supporting hunters, photographers, and nature enthusiasts at an elevated position in a tree to watch for game or observe wildlife. At that position, the view of the surrounding terrain is increased, a field of aim is improved, and the user is less likely to be seen by wildlife.

Unfortunately, it is difficult to attach a tree stand to a tree. The user must while holding the platform in position adjacent to a tree trunk, move a chain or yoke around a back side of the tree trunk, secure and tighten it firmly against the tree. These tasks are cumbersome for the user because one hand is occupied supporting the platform. Any noise which is generated may alert nearby wildlife. Some tree stands have a limp chain which is both noisy and awkward to secure. Further aggravating the difficulty is that the user is frequently at an uncomfortable position, standing on a branch of a tree in a dark, wet or cold environment. These tasks are potentially hazardous, and many users have inadvertently fallen and received injury.

Another drawback of conventional tree stands is that they are limited for use on trees which are nearly perfectly vertical. Some trunks or sections of trunks deviate from a vertical orientation by 10 degrees or more. A conventional tree stand is configured to align axially parallel with a tree trunk and engage the trunk generally facing a radial axis of the trunk to provide a stable attachment. When the tree trunk is slanted, the result is a laterally inclined platform which is uncomfortable and hazardous.

Moreover, conventional tree stands have a seat arrangement which is inconvenient. These stands provide a seat on a unit which is separate from the platform assembly, requiring duplicate attachment and leveling tasks and which increases total weight and bulkiness. Alternatively the seat is on a common structure with the platform, but it must be partially disconnected before the tree stand can be collapsed to a compact, portable configuration.

SUMMARY OF THE INVENTION

Among the several objects and features of the present invention may be noted the provision of a tree stand which is easily attached to a tree; the provision of such a tree stand which is level when attached to trees which deviate from vertical orientation; the provision of such a tree stand which collapses to a compact, portable configuration; the provision of such a tree stand which provides a level seat; and the provision of such a tree stand which is economical.

In general, a tree stand according to the present invention is adapted for mounting in a tree to support a person. The stand comprises a back frame configured for engaging a trunk of the tree and a platform attached to the back frame. A length of chain passes generally horizontally around the trunk to secure the back frame to the tree. The chain is configured to be generally rigid and self-supporting in the vertical direction but freely movable in the horizontal direction. The length has a first end portion secured to the back frame and a second end portion adapted for releasable connection to the back frame so that the chain may form a loop generally around the trunk. The length of chain is freely moveable when the second portion is disconnected from the back frame to wrap around the trunk of the tree. A hook is secured to the back frame and configured to engage the second end portion to secure the length in the loop around the trunk. A ratchet mechanism controllably decreases a circumference of the loop around the trunk for securing the back frame to the tree.

In another aspect, a tree stand according to the present invention is adapted for mounting in a level orientation in a tree to support a person. The stand comprises a frame member configured for placement generally vertically in a position adjacent a tree trunk and a platform attached to the frame member for placement at a level orientation. A securing member passes around the tree trunk and is adapted for connection to the frame member for use in securing the frame member to the tree trunk. A rest is configured for engaging the tree trunk to support at least a portion of the tree stand away from the trunk. The rest is pivotally mounted on the tree stand so that the rest may be pivotally adjusted to engage a non-vertical tree trunk so as to arrange the platform in a substantially level orientation.

In yet another aspect, a foldable tree stand according to the present invention comprises a back frame configured for engaging a tree trunk and being securable to the trunk. The back frame has an upper end and a lower end. A platform pivotally attached to the back frame generally at the lower end is configured for placement at a level orientation to support a load. A seat is pivotally attached to the back frame at a position above the platform. A post for supporting the seat has a top end which is engageable by the seat and a bottom end. The post is pivotally attached to the platform generally adjacent the bottom end. The back frame, platform, seat, and post are hinged together in an articulated structure collectively approximating a parallelogram. The structure is capable of tilting while maintaining the seat and the platform in generally parallel relation. The structure is foldable between a deployed position in which the upper end of the back frame and the top end of the post are spaced above the platform and a collapsed position in which the upper end and top end are generally adjacent the platform. The seat is adapted to maintain engagement with the top end of the post as the structure tilts across a full range of motion between the deployed and collapsed positions.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENTS

Figure 1:
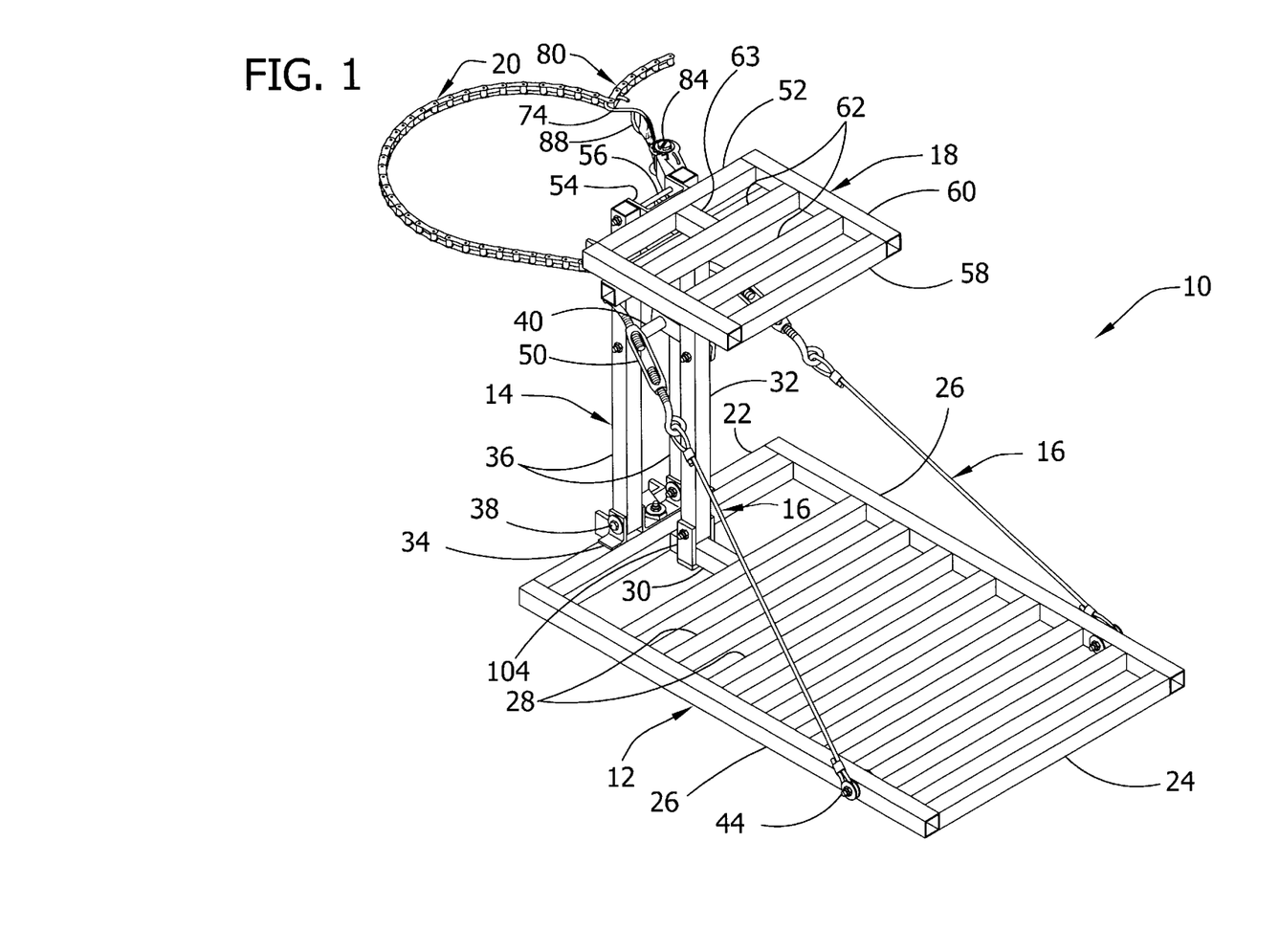
FIG. 1 is a perspective of a tree stand according to the present invention.

Referring now to the drawings and in particular to FIG. 1, a tree stand of the present invention is indicated generally at 10. The tree stand 10 includes a platform 12, a back frame 14, a pair of support members 16, a seat 18, and a length of chain 20 for passing around a trunk of a tree (not shown).

The platform 12 has an inner end 22 for placement adjacent to the tree, an outer end 24, and lateral sides 26, collectively forming a generally rectangular shape. Several parallel, spaced cross pieces 28 extend between the sides 26. A single longitudinal rib 30 near the inner end 22 extends transversely between two cross pieces 28 for supporting a post 32, which is described hereinafter. The platform 12 has angle brackets 34 on its inner end 22 for pivotally attaching the platform to the back frame 14. The angle brackets 34 may be welded to the inner end 22 or attached by a fastener. In conventional use, the platform 12 is placed at a level orientation and is configured for supporting a load, such as a person's weight. Alternate constructions or shapes of the platform, including a solid or meshed panel, do not depart from the scope of this invention.

The back frame 14 comprises two spaced, parallel bars 36 which are placed in a generally vertical orientation adjacent to the tree trunk. Each bar 36 is pivotally connected at a lower end to the inner end 22 of the platform by a bolt 38 extending through the angle brackets 34, and each bar is pivotally connected at its upper end to the seat 18. The two parallel bars 36 may be joined by one or more lateral ties 40 extending transversely between the bars to increase rigidity of the back frame. It is understood that the back frame 14 could have a different relative size or a different number of components, including one, without departing from the scope of this invention.

Figure 2:
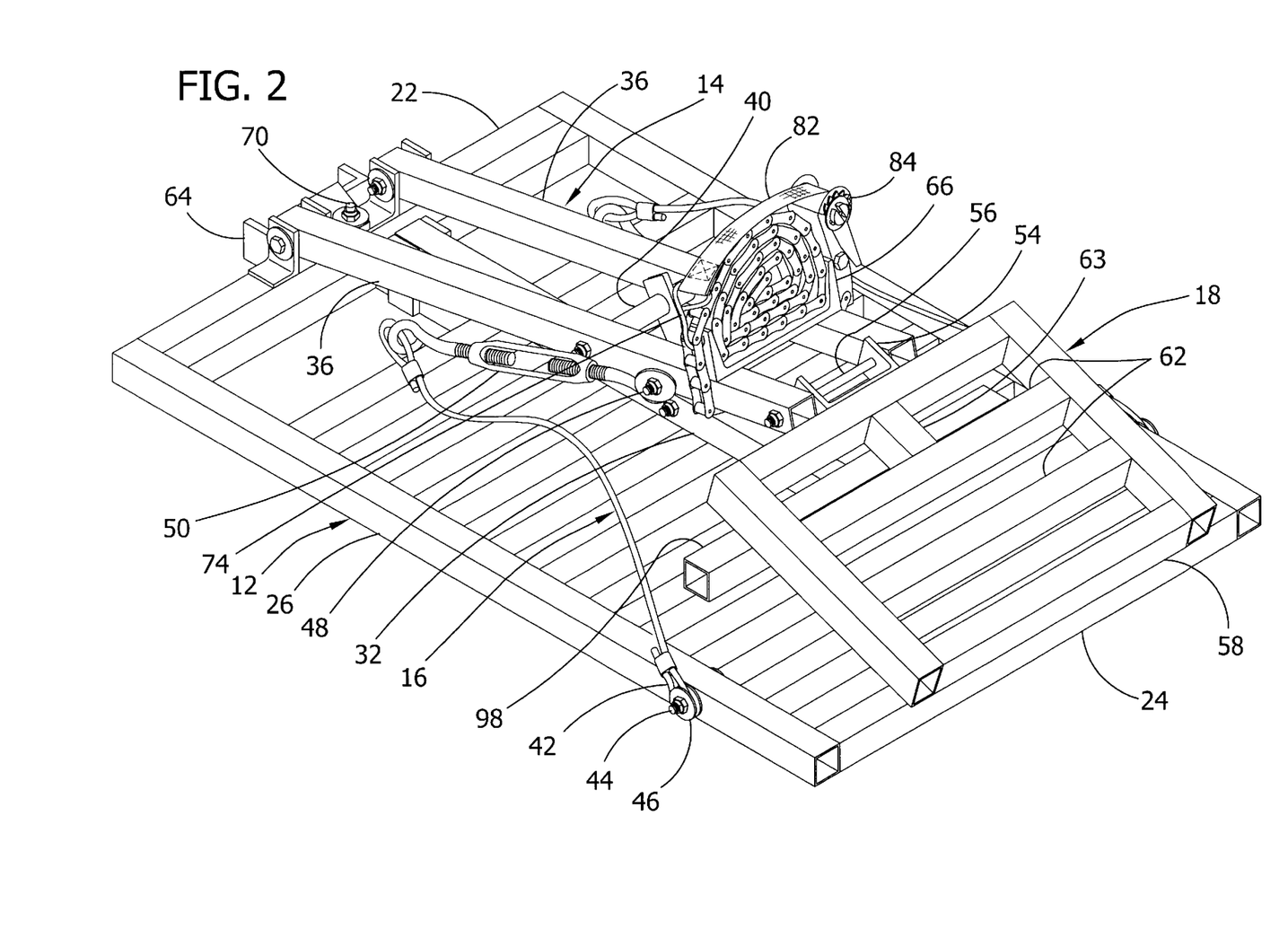
FIG. 2 is a perspective of the tree stand at a collapsed position.

Each of the support members 16 extend between the back frame 14 near its upper end and one of the sides 26 of the platform near its outer end 24. Preferably, each support member 16 comprises a flexible cable. The support member is pivotally attached at both ends. A front end of each support member 16 (FIGS. 2 and 4) includes a loop 42 which encircles a bolt 44 extending through the side 26 of the platform and is captured between spaced washers 46. A rear end of each support member 16 is pivotally attached to the back frame 14 by a bolt 48. Other types of support members, including rigid arms or arm assemblies, and other types of attachments do not depart from the scope of this invention.

Preferably, each support member 16 includes a turnbuckle mechanism 50 for changing a length of the member to change an angle of inclination of the platform 12. Adjustment may be made while the stand is unloaded or while a user is standing on the platform. The angle of inclination of the platform 12 may be adjusted by rotating the turnbuckles 50 about their longitudinal axes and thereby extending or contracting the support members 16. Rotation in a first direction lengthens the support member, and rotation in a second, opposite direction shortens the support member. The support members 16 and platform 12 are arranged and interconnected such that adjustment of lengths of the support members changes an angle formed between the back frame 14 and the plane of the platform. Similar support arm assemblies and tree stand are described in co-owned U.S. Pat. No. 4,995,475, entitled "Hunter's Portable Tree Stand," which is hereby incorporated by reference.

In conventional use, both support members 16 are adjusted to have about the same lengths to place the platform 12 at a level orientation. However, for unusual trees or for user preference, the two support members may be adjusted to differing lengths.

The seat 18 has a construction similar to the platform 12 but with a relatively smaller length and a smaller width. The seat 18 has an inner end 52 for placement adjacent to the tree and which is pivotally attached to the back frame 14. The inner end includes a bracket 54 (FIG. 2) which fits between the two bars 36 of the back frame and is pivotally attached thereto by a bolt 56. The seat has an outer end 58 and lateral sides 60 collectively forming a rectangular shape, although other constructions and shapes do not depart from the scope of this invention. Parallel cross pieces 62 extend between the sides 60, and a single longitudinal rib 63 extends between two cross pieces near the inner end.

Figure 3:
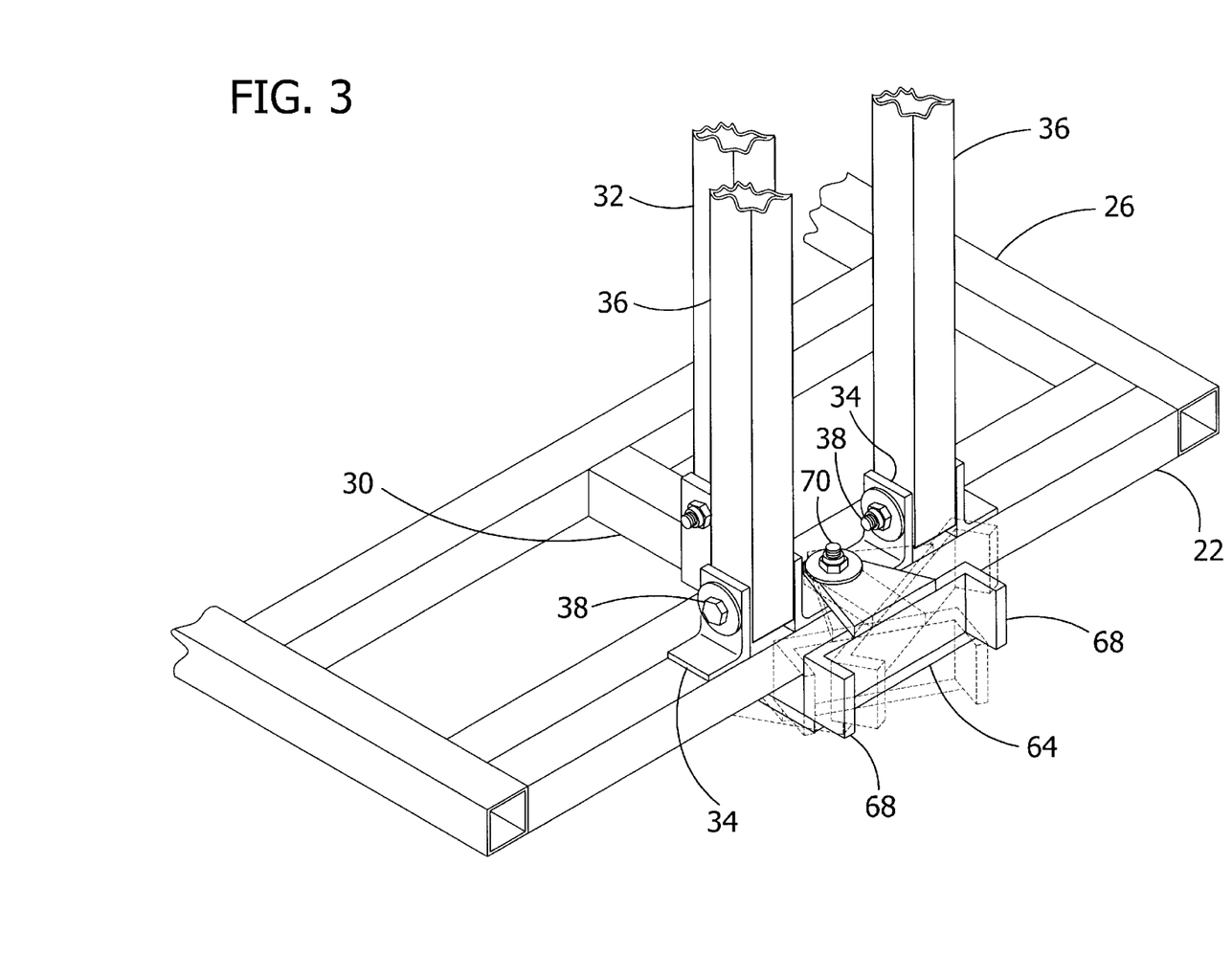
FIG. 3 is an enlarged fragmentary perspective of the tree stand from the rear and showing a pivotable rest.

First and second rests 64, 66 are provided for engaging the tree trunk and supporting the tree stand 10 at a small distance away from the trunk. The first, lower rest 64 (FIG. 3) is attached to the platform 12 at its inner end 22, and the second, upper rest 66 (FIGS. 4 and 5) is fixedly attached to the back frame 14 near its upper end. The vertical spacing between the first and second rests 64, 66 provides for longitudinal (up and down) stability of the tree stand against the tree. Each rest has two feet 68 which are vertically oriented for stable engagement on typical tree bark surfaces and laterally spaced for lateral (side-to-side) stability. The rests 64, 66 are each configured to engage the tree trunk generally in alignment with a radial axis of the trunk, with the feet 68 extending in a direction generally toward an internal center of the trunk. That provides a stable mount with approximately equal forces transmitted through each of the two feet 68. Other types of rests, or a tree stand with no rest wherein the platform or back frame directly engage the tree trunk, do not depart from the scope of this invention.

The first rest 64 is adjustably pivotally movable (FIG. 3) relative to the tree stand 10 to engage tree trunks which are either vertical or which deviate from vertical, and while maintaining the platform 12 in a substantially level orientation. A bolt 70 which attaches the first rest 64 to the platform functions as a pivot pin. The tree stand is attached to any tree with the back frame 14 generally vertical, with the first rest 64 directly beneath the second rest 66, in order to obtain the platform being level. Therefore, when attached to a tree trunk which is perfectly vertical, the back frame 14 is kept in alignment with the trunk. Each of the two rests 64, 66 is placed on the trunk generally at a local apex of the circumferential curvature of the outer surface of the trunk, at a lateral center of the trunk. The first rest 64 is pivoted to a neutral position (indicated in solid on FIG. 3), with the feet 68 being generally perpendicular to the inner end 22 of the platform. At that position, the first rest engages the trunk generally in alignment with the radial axis of the trunk and the feet extend generally toward the internal center of the trunk.

However, when attached to a trunk which deviates from vertical, the vertical back frame 14 is not aligned with the trunk. The upper, second rest 66 is placed on a lateral center of the outer surface of the trunk, but the lower, first rest 64 must be placed at a position offset from a lateral center of the trunk, and laterally spaced from a local apex of the trunk's circumferential curvature. To compensate, the first rest 64 is pivoted to a rotated position such as one of the positions indicated in phantom on FIG. 3. In that way, both rests 64, 66 engage the tree trunk generally in alignment with radial axes of the trunk, with all feet 68 extending in a direction generally toward the internal center of the trunk. The result is a firm, stable attachment. The rests can have alternate attachments, such as being movable in more than one axis, or both rests may be pivotally movable, without departing from the scope of this invention.

The length of chain 20 is provided for passing generally horizontally around a back side of the trunk to secure the back frame 14 to the tree. The chain 20 is a conveyor type chain which is oriented so that the chain is generally rigid and self-supporting in the vertical direction but freely movable in the horizontal direction because of the pivotal interconnection of links making up the chain. The links have spacings defining openings 72 (FIG. 4) which are sized for receiving a hook 74. The length of chain 20 has a first end portion indicated generally at 76 (FIG. 5) which is secured to the back frame 14 generally at the second rest 66. Two bolts 78 with end nuts (FIG. 5) secure the chain to a lateral tie 40 of the back frame. An opposite, second end portion of the chain 20, indicated generally at 80, is adapted for releasable connection to the back frame 14 so that the chain may form a loop generally around the trunk. The length of chain is freely moveable when the second portion 80 is disconnected from the back frame so that it may wrap around or unwrap from the trunk of the tree. Other types of chain or other non-chain securement members for passing around the tree do not depart from the scope of this invention.

The hook 74, a flexible strap 82, and a ratchet mechanism 84 (FIG. 5) are interconnected and secured to the first end portion 76 of the length of chain to comprise a segment of the loop. It is not necessary for the strap 82 or ratchet mechanism 84 to be connected to the first end portion 76 of the chain. These components may be separately attached to the stand 10. The hook 74 is configured to engage the second end portion 80 of the length of chain. A curved end 86 of the hook 74 defines a hooking plane, and an opposite end of the hook includes an eye 88 (FIGS. 1 and 5) which receives the strap 82 and is turned 90 degrees from the hooking plane so that the strap is not twisted when the hook is connected to the chain 20. The end 86 of the hook may curve either direction, i.e., outwardly from the loop or inwardly. The strap 82 interconnects the hook 74 and ratchet 84 and is made of a suitable durable material, such as canvas, which may be wound on the ratchet. The ratchet 84 is provided for controllably winding the strap 82 to decrease a circumference of the loop around the trunk and secure the back frame to the tree. Other arrangements for selectively tightening the length of chain do not depart from the scope of this invention.

The ratchet 84 is disposed between the hook 74 and the first end portion 76 of the length of chain. It is conventional in construction and includes a base 90 (FIG. 5), a handle 92 pivotally attached to the base, and a spool winding the strap. A sprocket wheel 94 having cog teeth engages a spring-loaded cam 96. A release (not shown) is provided for releasing the cam from the sprocket wheel to permit unwinding the strap 82 from the spool, providing slack, and removal of the hook 74 from the chain 20.

The length of chain 20 is moveable to a stowed position (FIG. 2) wherein the length is coiled and secured to the back frame 14 in a compact, portable configuration. The user may roll the chain into a coil-and secure it generally between the two feet 68 of the second rest 66. The hook 74 can be received within links of the chain 20 and the ratchet mechanism 84 tightened to secure the chain in the stowed position. When the user is ready to attach the tree stand to a tree trunk, the chain 20 is deployed. The tension of the ratchet 84 is released so that the hook and strap can be removed from around the coil of chain. The length of chain 20 can be unfurled from the stowed position with one hand. A gentle nudge will start the coil moving around the tree trunk. The user can provide an initial direction of motion to the coil as it begins unwinding. The chain continues in that initial direction and generally conforms itself to the external contour of the tree trunk and essentially wraps itself around the tree. Significantly, the chain 20 moves very quietly and does not alert nearby wildlife. The user grips the second end portion 80 of the chain after it has unwound and traveled around the trunk, and then inserts the hook 74 into any link and tightens the ratchet 84.

Figure 4:
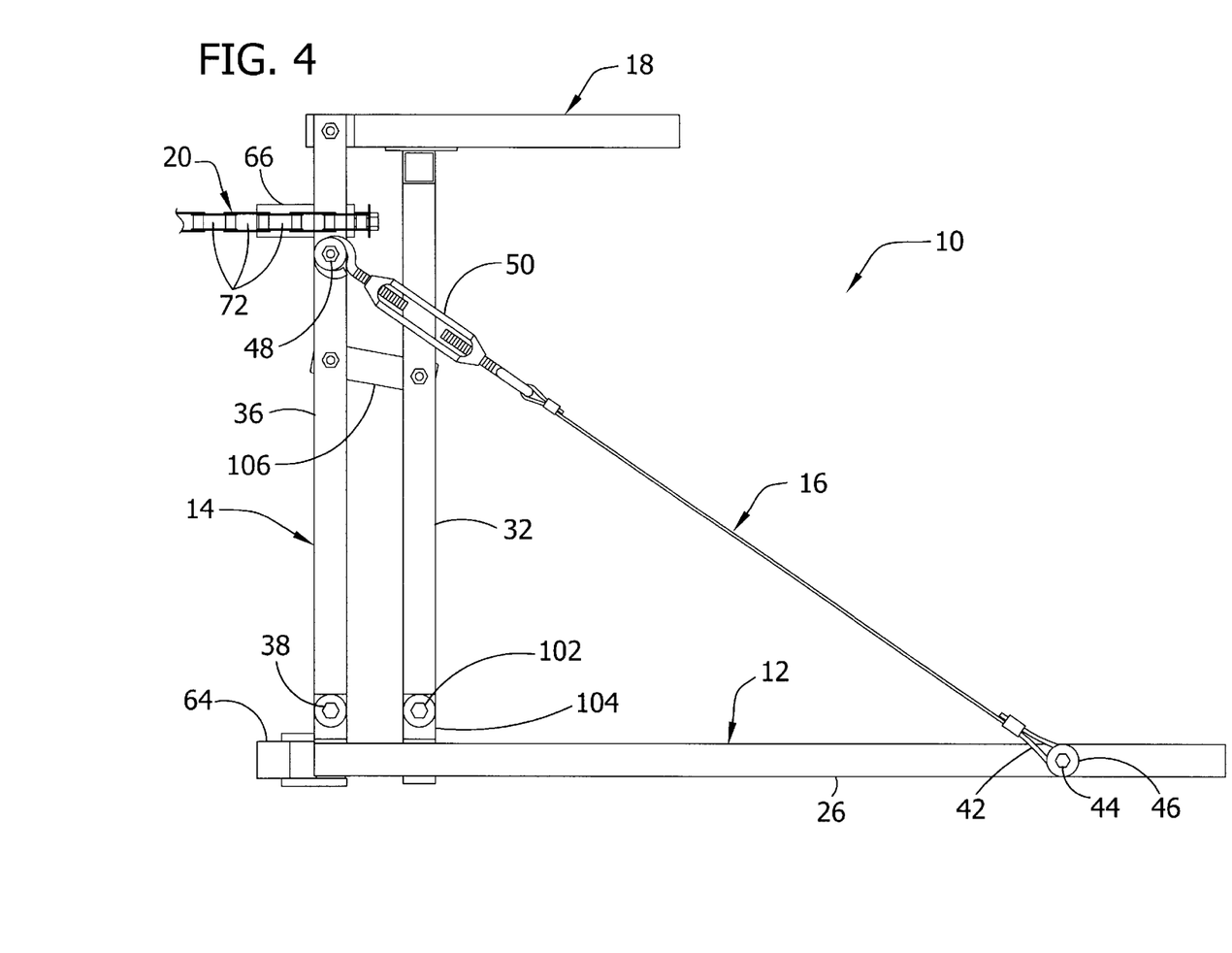
FIG. 4 is a side elevation of the tree stand with a portion of a chain thereof broken away.
Figure 5:
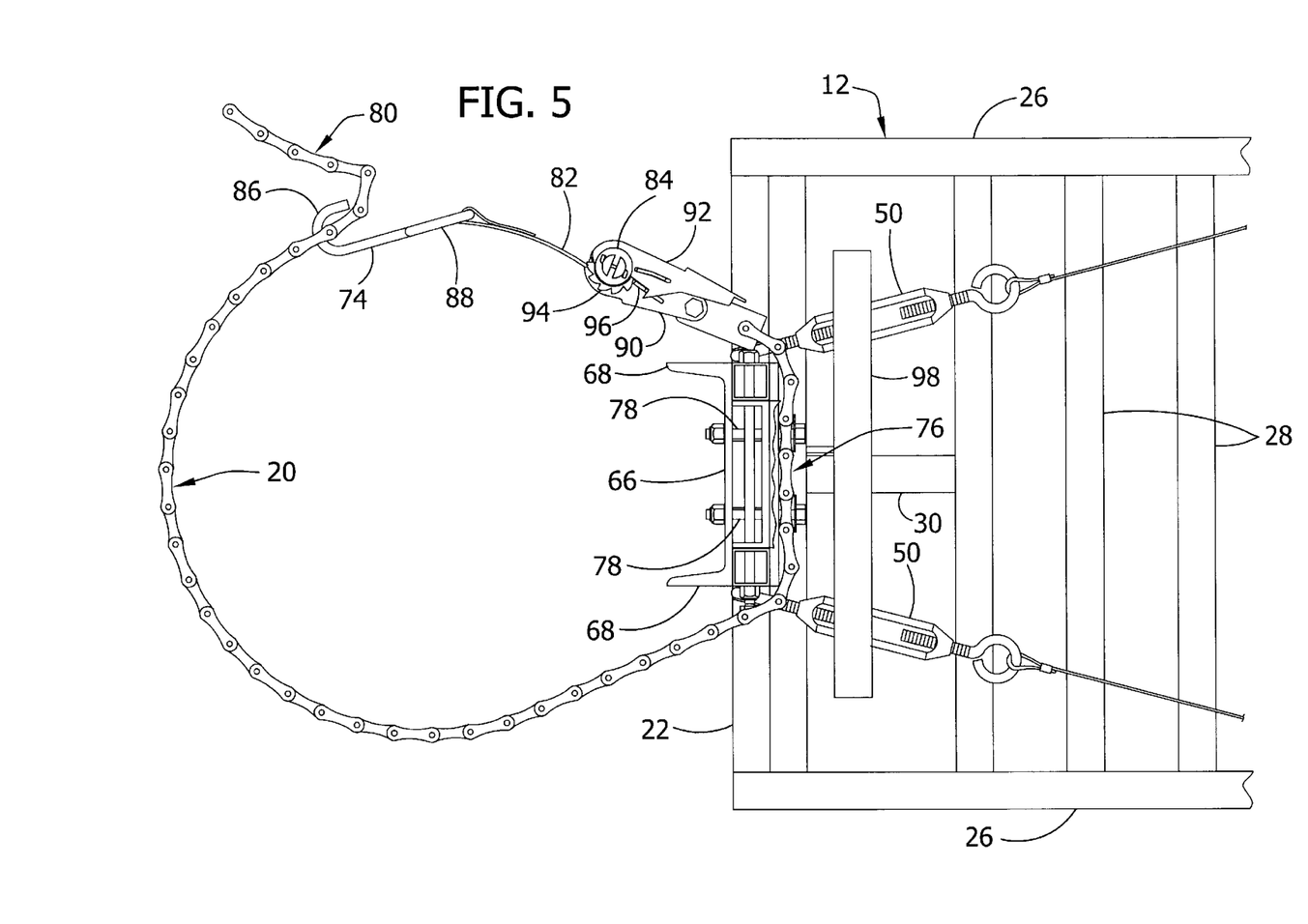
FIG. 5 is a fragmentary view in plan of the tree stand of FIG. 1 with the seat removed for clarity.
Figure 6:
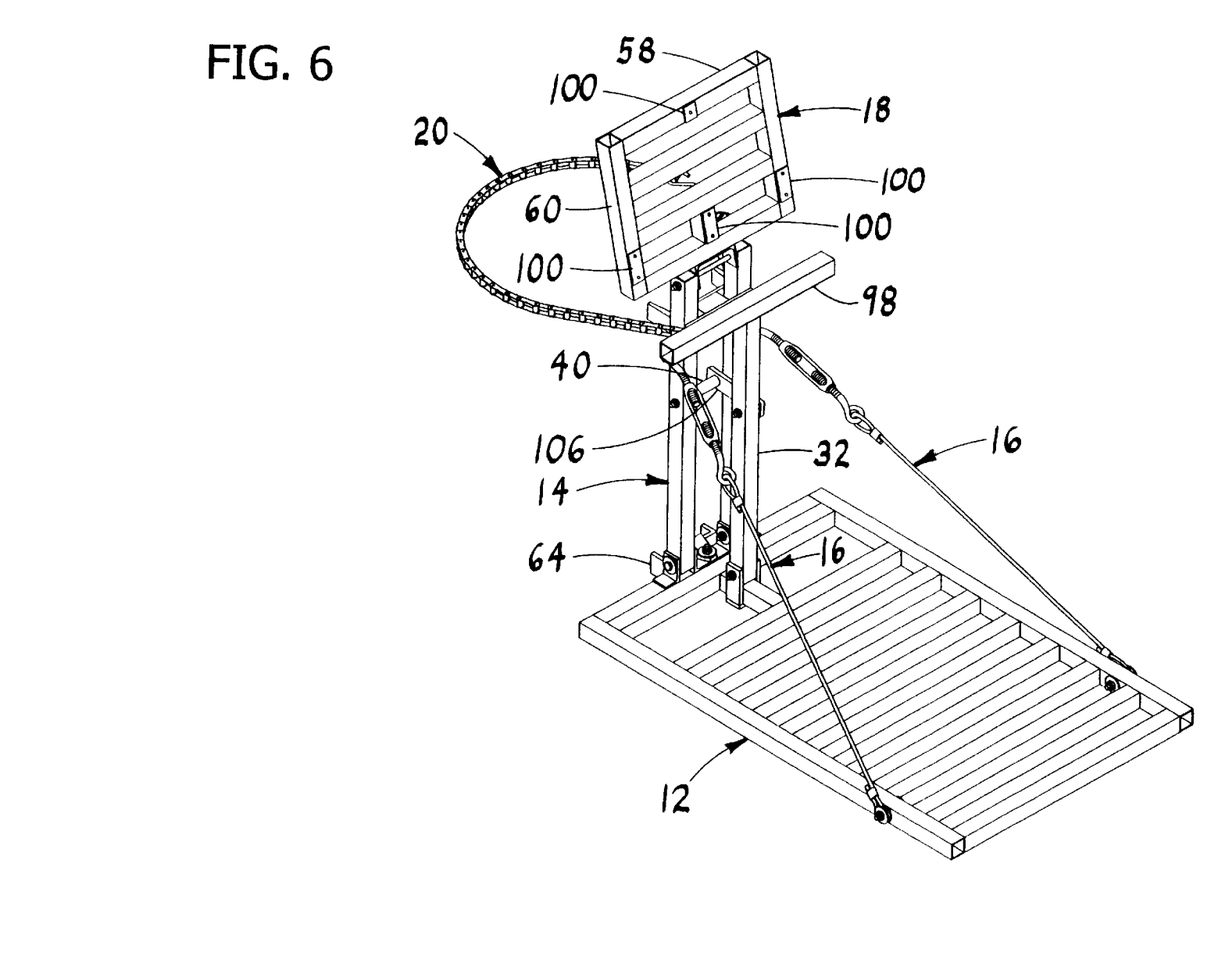
FIG. 6 is a view similar to FIG. 1 with the seat at a raised position.

The post 32 (FIG. 4) supports the seat 18 at a position generally parallel to the platform 12. A top end of the post includes a cross bar 98 (FIG. 6) and generally forms a T-shape. As shown in FIGS. 1 and 4, the seat 18 engages the cross bar 98 at the top end of the post but is at all times free of fixed connection to the post. The longitudinal rib 63 and each of the lateral sides 60 of the seat rest upon the cross bar 98. Engagement pads 100 (FIG. 6) are provided as cushions to decrease noise and to reduce friction when the seat 18 slides relative to the post 32. The pads 100 are made of a suitable soft material such as rubber or leather. A bottom end of the post 32 is pivotally attached to the platform 12 at its longitudinal rib 30 by a bolt 102 (FIG. 4) extending through the post and through upstanding tabs 104 (FIGS. 1 and 4) on the rib.

The seat 18 is pivotally moveable between the resting position (FIG. 1) and a raised position (FIG. 6) without detachment or disassembly of any part. When the user prefers additional space or does not require the seat, such as when preparing to fire a weapon, the user pivots the seat to the raised position. The seat 18 pivots quickly and silently so as to not alert nearby wildlife, and unlike tree stands of the prior art, does not require disconnection of any mating parts. When ready to use the seat again, the user rotates the seat back down until it rests on the cross bar 98 of the post. The motion is easy and the user does not need to align, attach, or connect any part of the seat with any other part of the tree stand.

A pivotal link 106 (FIG. 4) connects the post 32 and the back frame 14 and keeps them in a generally parallel relation. The link 106 is spaced above the platform 12 and is pivotally attached on its opposite ends to the post 32 and to a lateral tie 40 of the back frame. Significantly, the link 106 holds the post 32 upright when the seat is at the raised position (FIG. 6) so that the post does not fall or flop over and generate unwanted noise.

The seat 18 is conveniently and automatically maintained in parallel relation with the platform 12. The back frame 14, platform 12, seat 18, and post 32 are hinged together in an articulated structure collectively approximating a parallelogram which may be tilted while maintaining the seat and the platform in generally parallel relation. When the turnbuckles 50 are rotated to shorten or lengthen the support members 16 and thereby adjust the inclination of the platform 12, the inclination of the seat 18 is simultaneously and correspondingly adjusted. As the platform 12 pivots relative to the back frame 14, its motion moves the post 32 up or down which in turn pivots the seat. The structure is foldable between the deployed position (FIGS. 1 and 4) in which the upper end of the back frame 14 and the top end of the post 32 are spaced above the platform 12 and a collapsed position (FIG. 2) in which the upper end and top end are generally adjacent the platform. At the collapsed position, the tree stand 10 is compact and more readily portable. The link 106 has a length and position configured so that the back frame 14 and post 32 may pivot without interfering or catching on adjacent components. The seat 18 maintains its engagement with the top end of the post 32 as the structure tilts across a full range of motion between the deployed and collapsed positions. There is no need for the user to disconnect or partially disassemble any engageable parts, including specifically the seat 18 which may remain at the resting position. The tree stand 10 folds to the collapsed position which the user may accomplish in a straightforward and quick motion by pivoting of the back frame relative to the platform.

The platform 12, seat 18, post 32, and back frame 14 are each formed from suitable lightweight and strong materials, such as aluminum tubes. Alternate materials do not depart from the scope of this invention.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A tree stand adapted for mounting in a tree to support a person, the stand comprising:
    a back frame configured for engaging a trunk of the tree, the back frame comprising a first rest for engaging the tree and a second rest for engaging the tree which is spaced vertically from the first rest, at least one of the rests comprising two laterally spaced feet for engaging the tree trunk;
    a platform attached to the back frame;
    a length of chain for passing generally horizontally around the trunk to secure the back frame to the tree, the chain configured to be generally rigid and self-supporting in the vertical direction but freely movable in the horizontal direction, said length having a first end portion secured to the back frame and a second end portion adapted for releasable connection to the back frame so that the chain may form a loop generally around the trunk, said length of chain being freely moveable when said second portion is disconnected from the back frame to wrap around the trunk of the tree, said length of chain being mounted on the frame for movement into a coil in a stowed position secured generally between said two laterally spaced feet;
    a hook secured to the back frame and configured to engage said second end portion to secure the length in the loop around the trunk; and
    a ratchet mechanism for controllably decreasing a circumference of the loop around the trunk for securing the back frame to the tree.

2. The tree stand as set forth in claim 1 further comprising a flexible strap interconnecting said hook and the back frame.

3. The tree stand as set forth in claim 2 wherein the ratchet mechanism is disposed between the hook and the back frame and is configured to selectively shorten said segment of flexible strap and thereby decrease the circumference of the loop.

4. The tree stand as set forth in claim 3 wherein the second end portion of the length of chain includes links defining openings sized for receiving the hook.

5. The tree stand as set forth in claim 1 wherein at least one of said first and second rests are adjustably pivotable relative to the tree stand to engage the trunk at a selected orientation thereto.

6. A tree stand adapted for mounting in a level orientation in a tree to support a person, the stand comprising:
    a frame member configured for placement generally vertically in a position adjacent a tree trunk;
    a platform attached to the frame member for placement at a level orientation;
    a securing member for passing around the tree trunk and being adapted for connection to said frame member for use in securing the frame member to the tree trunk;
    a first rest configured for engaging the tree trunk to support at least a portion of the tree stand away from the trunk; and
    a second rest configured for engaging the tree trunk, the second rest being vertically spaced from the first rest and being fixedly attached to the frame member;
    the first rest being pivotally mounted on the tree stand about a generally vertical axis so that the rest may be pivotally adjusted about said generally vertical axis to engage a non-vertical tree trunk so as to arrange the platform in a substantially level orientation.

7. The tree stand as set forth in claim 6 wherein said first and second rests each comprise two laterally spaced feet for engaging the tree trunk.

8. A foldable tree stand comprising:
    a back frame configured for engaging a tree trunk and being securable to the trunk, the back frame having an upper end and a lower end;
    a platform pivotally attached to the back frame generally at said lower end, the platform configured for placement at a level orientation to support a load;
    a seat pivotally attached to the back frame at a position above said platform;
    a post for supporting said seat, the post having a top end which is engageable by the seat and a bottom end, the post being pivotally attached to the platform generally adjacent the bottom end; and
    a link connecting the post and the back frame, the link being pivotally attached to the post, pivotally attached to the back frame, and spaced above the platform:
    wherein the back frame, platform, seat, and post are hinged together in an articulated structure collectively approximating a parallelogram, the structure being capable of tilting while maintaining the seat and the platform in generally parallel relation, and foldable between a deployed position in which the upper end of the back frame and the top end of the post are spaced above the platform and a collapsed position in which the upper end and top end are generally adjacent the platform, the seat being adapted to maintain engagement with the top end of the post as the structure tilts across a range of motion between the deployed and collapsed positions.

9. The tree stand as set forth in claim 8 wherein the top end of the post includes a cross bar generally forming a T-shape, the seat engaging the cross bar.

10. The tree stand as set forth in claim 9 wherein the seat is pivotally moveable to a raised position.

11. The tree stand as set forth in claim 9 further comprising a pair of support members each having a front end secured to the platform and a rear end secured to the back frame, the support members having a selectively adjustable length for adjusting an angle of the platform with respect to the back frame to the level orientation.

12. The tree stand as set forth in claim 11 wherein the support members comprise cables and turnbuckles.

13. The tree stand as set forth in claim 8 wherein the seat is free of fixed connection to the top end of the post.

* * * * *